US009570770B2

United States Patent
Gerlier et al.

(10) Patent No.: US 9,570,770 B2
(45) Date of Patent: Feb. 14, 2017

(54) UNDERWATER VEHICLE HAVING AN ELECTROLYTE-ACTIVATED ELECTROCHEMICAL FUEL CELL

(75) Inventors: Francois Gerlier, Marseilles (FR); Thomas Senez, Sainte-Maxime (FR); Alexandre Lemasquerier, Bayeux (FR)

(73) Assignee: DCNS, Paris (FR)

( * ) Notice: Subject to any disclaimer, the term of this patent is extended or adjusted under 35 U.S.C. 154(b) by 415 days.

(21) Appl. No.: 13/824,089

(22) PCT Filed: Apr. 13, 2012

(86) PCT No.: PCT/EP2012/056826
§ 371 (c)(1),
(2), (4) Date: Dec. 16, 2013

(87) PCT Pub. No.: WO2012/140227
PCT Pub. Date: Oct. 18, 2012

(65) Prior Publication Data
US 2014/0113210 A1    Apr. 24, 2014

(30) Foreign Application Priority Data
Apr. 15, 2011    (FR) ...................................... 11 01191

(51) Int. Cl.
*H01M 8/04* (2016.01)
*H01M 6/34* (2006.01)
(Continued)

(52) U.S. Cl.
CPC ............ *H01M 8/04276* (2013.01); *B63G 8/08* (2013.01); *B63H 21/17* (2013.01); *F04D 29/445* (2013.01);
(Continued)

(58) Field of Classification Search
CPC ...... H01M 8/04276; H01M 2/40; H01M 6/34;
B63G 8/08; B63H 21/17; F04D 29/445;
F04D 29/52; F04D 29/183; F04D 29/444;
F04D 29/548; F04D 29/386; F42B 19/24
See application file for complete search history.

(56) References Cited

U.S. PATENT DOCUMENTS 5,506,065 A    4/1996    Tribioli et al.
5,532,079 A    7/1996    Tribioli et al.
(Continued)

FOREIGN PATENT DOCUMENTS

EP    0307292 A1    3/1989

OTHER PUBLICATIONS

Grundfos Research and Technology. The centrifugal Pump. Chapter 1: Intrudcition to Centrifugal Pumps. p. 1-128.*
(Continued)

*Primary Examiner* — Daniel Gatewood
(74) *Attorney, Agent, or Firm* — Knobbe Martens Olson & Bear LLP

(57) ABSTRACT

This underwater vehicle includes an electrolyte-activated electrochemical fuel cell to supply it with electrical power, which fuel cell includes:
- an electrochemical power production cell (3),
- a reservoir (4) to contain the electrolyte.
- means of circulation (7) of the electrolyte between the electrochemical cell (3) and the reservoir (4), comprising a semi-axial flow pump arranged axially in the reservoir and comprising a motorized wheel rotatably mounted in a diffuser, characterized in that the diffuser has the general shape of a dome to direct the flow of the electrolyte coming out of the pump in a direction substantially parallel to the axis of the pump, and thus of the reservoir.

13 Claims, 2 Drawing Sheets

(51) Int. Cl.
*B63H 21/17* (2006.01)
*B63G 8/08* (2006.01)
*F04D 29/44* (2006.01)
*F42B 19/24* (2006.01)
*H01M 2/40* (2006.01)

(52) U.S. Cl.
CPC ............... *F42B 19/24* (2013.01); *H01M 2/40* (2013.01); *H01M 6/34* (2013.01)

(56) References Cited

U.S. PATENT DOCUMENTS

| | | | | |
|---|---|---|---|---|
| 2007/0105460 | A1* | 5/2007 | Vivien | F42B 19/26 440/6 |
| 2007/0116560 | A1* | 5/2007 | Eslinger | F04D 29/2216 415/206 |
| 2011/0250059 | A1* | 10/2011 | Reischmann | F04D 29/126 415/203 |
| 2014/0106197 | A1* | 4/2014 | Gerlier | F04D 29/183 429/113 |

OTHER PUBLICATIONS

International Search Report for International Application No. PCT/EP2012/056826, mailed on Aug. 30, 2012.

\* cited by examiner

UNDERWATER VEHICLE HAVING AN ELECTROLYTE-ACTIVATED ELECTROCHEMICAL FUEL CELL

CROSS-REFERENCE TO RELATED APPLICATIONS

This application is the U.S. National Phase under 35 U.S.C. §371 of International Application PCT/EP2012/056826, filed Apr. 13, 2012, which was published in a non-English language, which claims priority to FR 11 01191, filed Apr. 15, 2011.

FIELD OF THE INVENTION

Background of the Invention

This invention concerns an underwater vehicle, such as a torpedo.

Such underwater vehicles consisting, e.g., of a torpedo such as a "heavy" torpedo comprise an electrolyte-activated electrochemical battery, which supplies electrical power to the rest of the vehicle for its operation, motorisation, etc.

Such electrical power supplies of such vehicles are already known from the prior art.

Thus, for example, one may refer to document EP A 0307222, which describes a device to form and circulate a liquid electrolyte in an alkaline fuel cell that can be started up for this type of application.

In fact, in this document, the electrochemical fuel cell comprises an electrochemical power production cell, a reservoir to contain the electrolyte, and means of circulation of the electrolyte between the electrochemical cell and the reservoir, comprising a pump.

Also classically, the pumps used may be semi-axial flow pumps arranged axially in the reservoir, comprising a motorised paddle wheel, connected, e.g., with an electrical drive motor which paddle wheel is rotatably mounted in a diffuser.

Other types of pumps, e.g., vane-cell pumps or others, have also been proposed for applications of this kind.

However, all the proposed solutions present a certain number of disadvantages, in particular as concerns the acoustic discretion of the vehicle.

In fact, it is known that one of the important functional characteristics of this type of vehicles, especially when they consist of weapons such as torpedoes, is their ability to be discreet, in particular from the acoustic standpoint, in order to be detected as late as possible by acoustic detectors corresponding to a possible target.

SUMMARY OF THE INVENTION

The aim of this invention is thus to solve these problems by improving the acoustic discretion of such vehicles.

To this end, the invention concerns an underwater vehicle including an electrolyte-activated electrochemical fuel cell to supply it with electrical power, which fuel cell includes:
an electrochemical power production cell,
a reservoir to contain the electrolyte.
means of circulation of the electrolyte between the electrochemical cell and the reservoir, comprising a semi-axial flow pump arranged axially in the reservoir and comprising a motorised wheel rotatably mounted in a diffuser, characterised in that the diffuser has the general shape of a dome to direct the flow of the electrolyte coming out of the pump in a direction substantially parallel to the axis of the pump, and thus of the reservoir.

According to other characteristics of this vehicle, individually or in combination:
the wheel of the pump is a non-axisymmetric wheel;
part at least of the inner surface of the diffuser includes paddles with axes that are offset from the axis of the pump;
the diffuser is suited to direct the electrolyte exiting the pump 360° around the axis of the pump; and
it consists of a torpedo.

BRIEF DESCRIPTION OF THE DRAWINGS

The invention will be better understood based on the following description, provided by way of example only, referring to the attached drawings, in which.

DETAILED DESCRIPTION OF THE PREFERRED EMBODIMENTS

Figure 1:
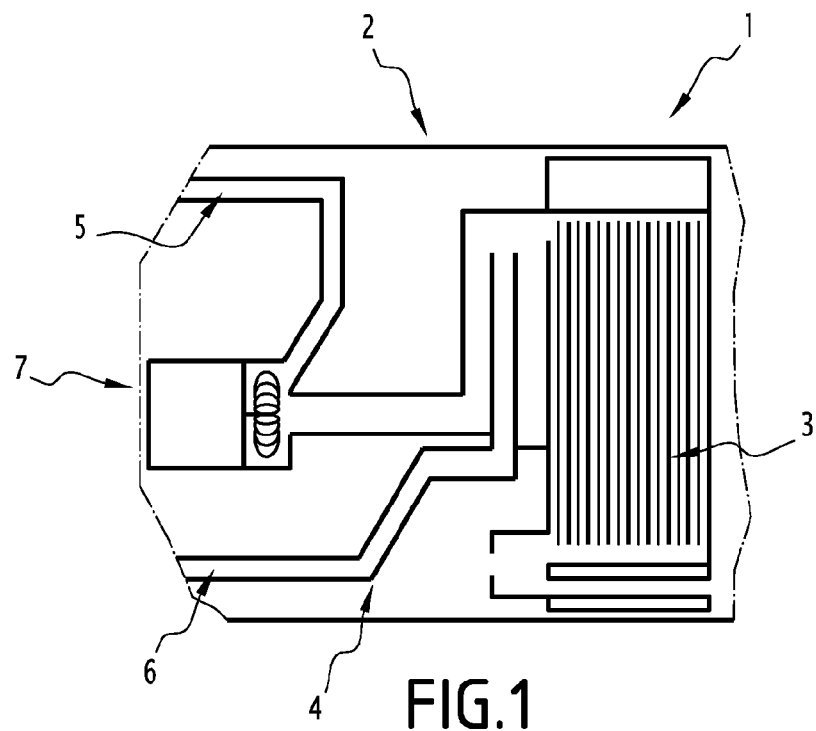
FIG. 1 shows a synoptic schematic of the general structure of a section of an electrochemical battery forming part of an underwater vehicle according to the invention.

In fact, in these drawings, in particular FIG. 1, a portion of an underwater vehicle is designated by general reference 1, consisting, e.g., of a "heavy" torpedo.

The more specifically illustrated portion of this vehicle is the "fuel cell" section 2 of the vehicle.

Classically, and as described in the aforementioned prior art, this fuel cell is an electrolyte-activated electrochemical battery, which supplies electrical power to the rest of the vehicle for its operation, motorisation, etc.

This electrochemical fuel cell thus comprises an electrochemical power production cell designated by general reference 3 on FIG. 1, connected to a reservoir for containing the electrolyte, which reservoir is designated by general reference 4.

This reservoir, and the reset of the vehicle, are, e.g., cylindrical.

The electrolyte may be in liquid or anhydrous form, whereby the fuel cell section then, in the latter case, classically includes an entrance pipe to bring seawater into the reservoir so as to dissolve the electrolyte in anhydrous form in order to form a liquid electrolyte when the fuel cell is started.

In FIG. 1, these means of entrance for seawater consist of a pipe designated by general reference 5.

Furthermore, and also classically, an exhaust pipe for the gases arising from the electrochemical cell may also be provided, designated by general reference 6.

Because this exhausting is classical and implements classical means of exhausting, it will not be described in detail below.

Lastly, this section also provides for means of circulation of the electrolyte between the electrochemical cell and the reservoir, designated by general reference 7 in FIG. 1.

This circulation allows for control of the operation, and in particular, of the temperature of the electrochemical cell as described in the aforementioned patent.

These means of circulation of the electrolyte between the electrochemical cell and the reservoir consist of a semi-axial flow pump arranged axially in the reservoir and, e.g., having its input connected to the cell and its output connected to the reservoir.

This pump thus classically includes a motorised paddle wheel, connected, e.g., with an electrical engine and rotatably mounted in a diffuser.

Figure 2:
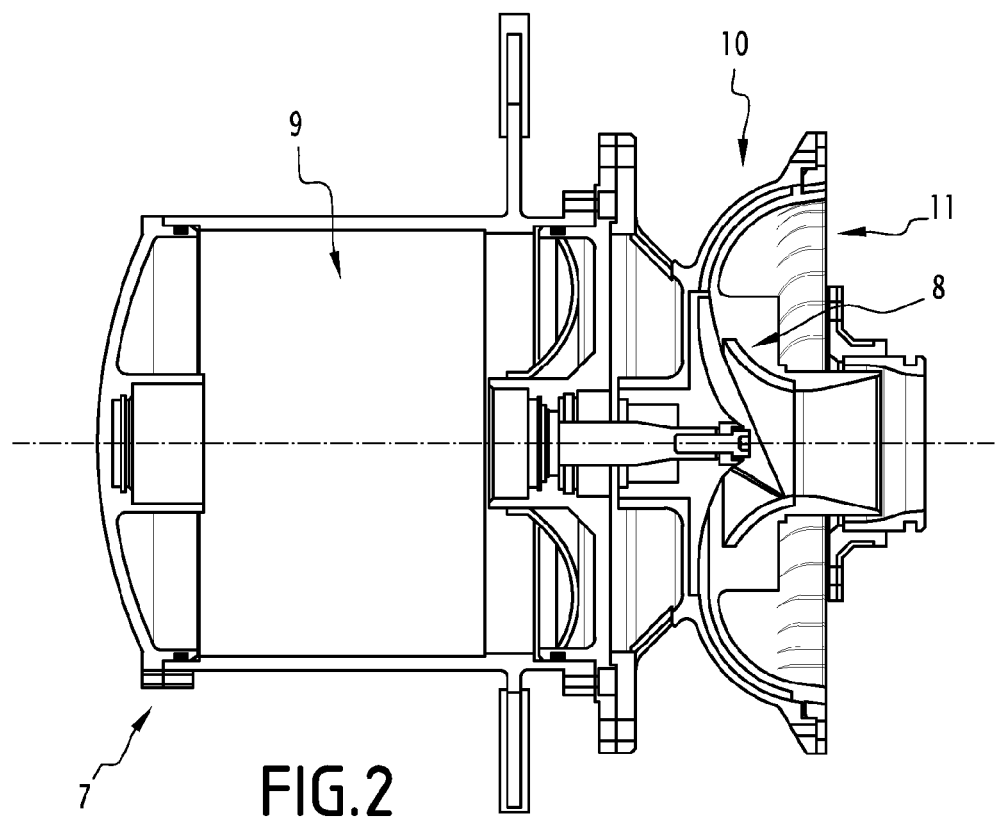
FIG. 2 shows a side cross-section view of a mixed-flow pump forming part of such a vehicle.
Figure 3:
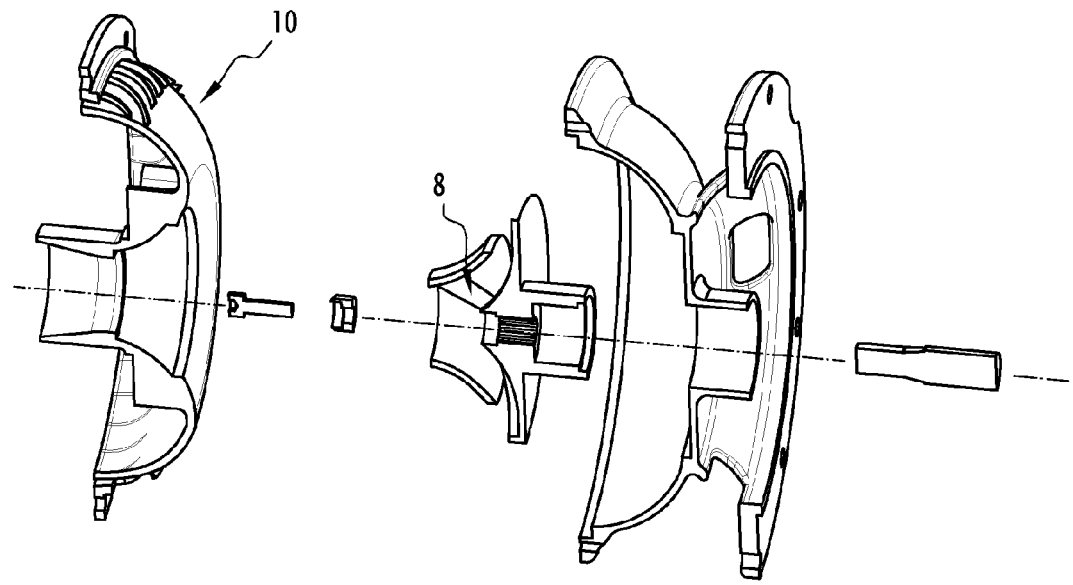
FIG. 3 shows a partial exploded and cross-section view of a wheel and diffuser forming part of such a pump.
Figure 4:
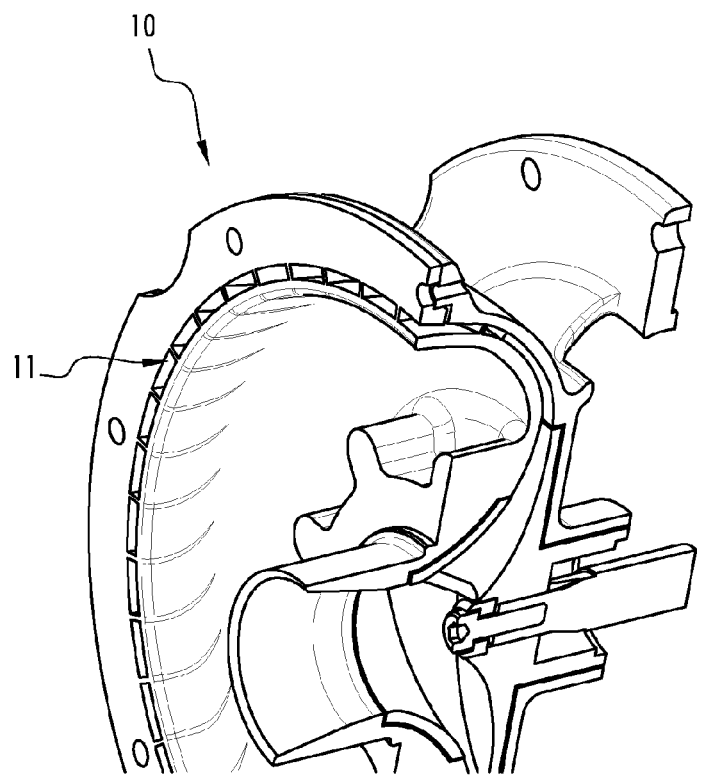
FIG. 4 shows a partial side perspective view of a diffuser and diffuser forming part of such a pump.

This semi-axial flow pump 7 is illustrated in greater detail in FIGS. 2, 3, and 4.

These drawings, in particular FIG. 2, show the means of circulation of the electrolyte designated by general reference 7.

As noted above, these means of circulation include a mixed-flow pump including a motorised wheel designated by general reference 8 in these drawings, and connected, e.g., to an electrical motor designated by general reference 9, such that the wheel turns in the diffuser designated by general reference 10.

According to one characteristic, the paddle wheel used by the semi-axial flow pump is a non-axisymmetric wheel.

This presents a certain number of advantages, in particular with regard to the acoustic discretion of the underwater vehicle.

In fact, the use of an on-axisymmetric wheel allows for expansion of the range of frequencies of the operation signature of the pump, and reduction of the amplitude of the acoustic energy radiated during its operation.

It can be seen that reducing this amplitude improves the discretion of the vehicle, and thus makes it more difficult to detect.

Various wheel shapes may thus be considered to meet these requirements.

Likewise, the diffuser 10 has a specific shape that also improves the acoustic discretion of the vehicle.

In fact, as shown in FIGS. 2-4, the diffuser 10 has the general shape of a dome for directing the electrolyte flow exiting the pump into a direction substantially parallel to the axis of this pump and the reservoir.

The electrolyte is pumped axially on entrance by the pump, and directed radially upon existing towards the diffuser, the dome shape of which allows for the electrolyte flow to be redirected so that it does not flow radially towards the wall of the reservoir, but axially within it in the direction of the cell.

This allows for reduction of the "acoustic bridge/column" phenomenon created between the pump and the wall of the reservoir of the underwater vehicle by the electrolyte flow exiting the pump, and also results in a reduction of the noise radiated by the engine, and thus an improvement of its discretion.

It should also be noted that at least one portion of the inner surface of this diffuser 10 may be equipped with paddles, e.g., 11, with axes offset with respect to the axis of this pump in order to rotate the electrolyte flow exiting the pump on its axis, for the aforementioned purpose of reducing the acoustic propagation of the noises produced by its operation.

In the exemplary embodiment described, the dome also ensures distribution of the redirected electrolyte flow 360° around the axis of the pump, which is arranged symmetrically around the axis of the pump and the reservoir.

This also improves the efficiency of electrolyte circulation, and thus the operation of the electrochemical fuel cell generally.

Of course, other embodiments are also possible.

What is claimed is:

1. An underwater vehicle including an electrolyte-activated electrochemical fuel cell devoted to supply said underwater vehicle with electrical power, which fuel cell includes:
    an electrochemical cell for power production,
    a reservoir for containing an electrolyte,
    a pump configured to circulate the electrolyte between the electrochemical cell and the reservoir, said pump being a semi-axial flow pump arranged axially in the reservoir and comprising a motorized wheel rotatably mounted in a diffuser, wherein the diffuser has the general shape of a dome to direct the flow of the electrolyte coming out of the pump in a direction parallel to the axis of the pump, and thus of the reservoir, such that the flow of the electrolyte does not flow radially toward the wall of the reservoir.

2. The underwater vehicle according to claim 1, wherein the wheel of the pump is a non-axisymmetric wheel.

3. The underwater vehicle according to claim 1 wherein at least one portion of the inner surface of the diffuser includes paddles with axes that are offset from the axis of the pump.

4. The underwater vehicle according to claim 1, wherein the diffuser is suited to direct the electrolyte exiting the pump 360° around the axis of the pump.

5. The underwater vehicle according to claim 1, wherein it consists of a torpedo.

6. The underwater vehicle according to claim 2 wherein at least one portion of the inner surface of the diffuser includes paddles with axes that are offset from the axis of the pump.

7. The underwater vehicle according to claim 2, wherein the diffuser is suited to direct the electrolyte exiting the pump 360° around the axis of the pump.

8. The underwater vehicle according to claim 3, wherein the diffuser is suited to direct the electrolyte exiting the pump 360° around the axis of the pump.

9. The underwater vehicle according to claim 2, wherein it consists of a torpedo.

10. The underwater vehicle according to claim 3, wherein it consists of a torpedo.

11. The underwater vehicle according to claim 4, wherein it consists of a torpedo.

12. The underwater vehicle according to claim 6, wherein it consists of a torpedo.

13. The underwater vehicle according to claim 7, wherein it consists of a torpedo.

* * * * *